No. 871,863. PATENTED NOV. 26, 1907.
G. H. ELLIS.
FEEDING MECHANISM FOR FLAX BREAKERS.
APPLICATION FILED APR. 22, 1907.
2 SHEETS—SHEET 1.
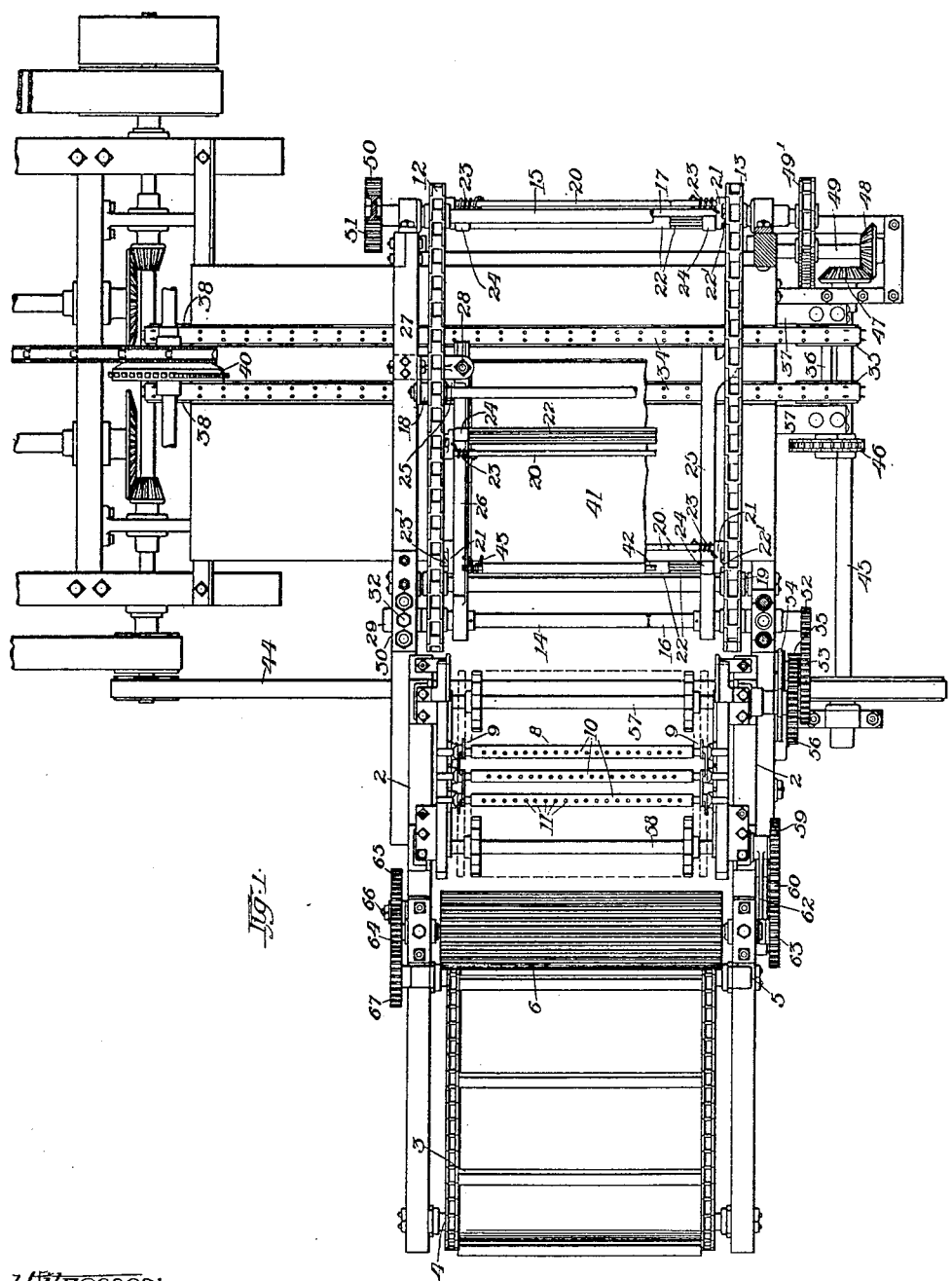
Witnesses:
Inventor:
George H. Ellis.

No. 871,863. PATENTED NOV. 26, 1907.
G. H. ELLIS.
FEEDING MECHANISM FOR FLAX BREAKERS.
APPLICATION FILED APR. 22, 1907.
2 SHEETS—SHEET 2.
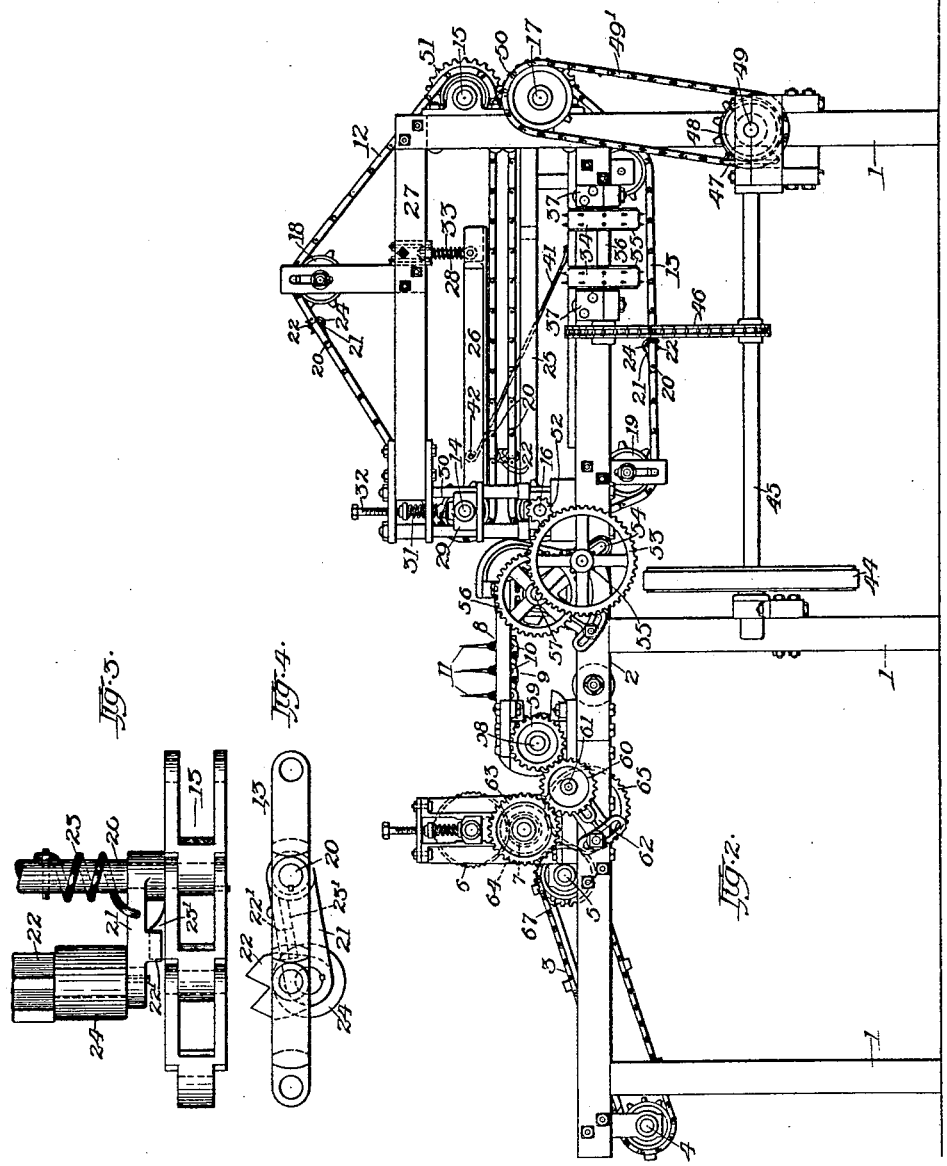
Witnesses:
Inventor:
George H. Ellis.
By Burgess
Attorney.

UNITED STATES PATENT OFFICE.

GEORGE H. ELLIS, OF ST. PAUL, MINNESOTA, ASSIGNOR TO INTERNATIONAL FLAX TWINE COMPANY, A CORPORATION OF MINNESOTA.

FEEDING MECHANISM FOR FLAX-BREAKERS.

No. 871,863.

Specification of Letters Patent.

Patented Nov. 26, 1907.

Application filed April 22, 1907. Serial No. 369,460.

*To all whom it may concern:*

Be it known that I, GEORGE H. ELLIS, a citizen of the United States, residing at St. Paul, in the county of Ramsey and State of Minnesota, have invented certain new and useful Improvements in Feeding Mechanism for Flax-Breakers, of which the following is a specification.

My invention relates to feeding mechanism to be used in connection with flax breakers wherein it is desired to present a uniform flow of straw in orderly arrangement to the breaking and scutching mechanism regardless of the possible excess in quantity placed upon the feed table; the object of my invention being to provide means for rapidly and efficiently straightening, arranging and advancing the straw toward the breakers in single, thin, uniform sheets. I attain this object by the mechanism illustrated in the accompanying drawing, in which—

Figure 1 represents a plan view of the feeder, showing the manner in which it is connected with a flax breaker; Fig. 2 is a side view of the feeder; and Figs. 3 and 4 represent details of the straw grasping mechanism forming parts thereof.

Like numerals of reference designate similar parts throughout the several views.

1 represents the legs of a main frame having longitudinally arranged side members 2 and upon which is mounted the feeder mechanism.

The feeding mechanism comprises what is termed primary and secondary means, the primary means consisting of an endless conveyer 3, mounted on cross shafts 4 and 5, having bearings at the forward end of the main frame and inclined upward is adapted to feed the bundles of straw endwise toward coacting, fluted feed rollers 6 and 7, arranged transversely relative to the main frame and adapted to deliver the straw to a horizontally arranged endless carrier 8 mounted in rear of said rollers and consisting of endless chains 9 suitably mounted at opposite sides of the main frame and connected by a series of bars 10, having teeth 11 secured thereto; the whole being operative in the manner of a gill chain to straighten and control the movement of the straw as it is delivered from the feed rollers and advance it toward secondary feeding mechanism, comprising upper and lower opposing endless carriers horizontally arranged, said endless carriers consisting of upper and lower endless chains 12 and 13, mounted at opposite sides of the main frame upon cross shafts 14 and 15, and 16 and 17, respectively, and 18 and 19 are sprocket wheels adjustable in a manner to control the tension of the chains in a common way.

20 represents transverse rods having their opposite ends secured in openings formed in the side bars of the carrier chains, the rods being spaced apart sufficient to receive the greatest length of straw between them. Pivotally connected with the rods by means of arms 21 are fluted bars 22, arranged parallel with the rods and adapted to engage with each other in the manner of grasping jaws. The bars are normally separated by means of springs 23 coiled about the rods, having one end secured thereto and their opposite ends engaging with the arms and operative to swing the arms and bars apart, the movement being limited by means of laterally extending lip portions $22^1$ and $23^1$, integral with the arms and links, respectively. The bars are provided with rollers 24 journaled thereon, and 25 represents horizontal guide rails secured to the frame upon opposite sides thereof and forming supporting members upon which the rollers of the lower series of bars run.

26 represents upper guide rails that are yieldingly supported upon a supplemental frame 27 by means of links 28 at their rear ends, and having their forward ends controlled vertically by the movement of the shaft 14 journaled in the boxes 29, which are slidably mounted in the yokes 30, in which they have vertical movement controlled in a common way by means of pressure springs 31 bearing upon the blocks, the degree of pressure thereof being regulated by means of adjusting screws 32, and 33 represents springs coiled about the links 28 and operative to yieldingly resist a vertical movement of the rear ends of the rails. The bars 22, traveling with the carrier chains, are arranged in a manner to coact as grasping jaws and to intermittently and successively seize a portion of the straw by its ends as presented by the primary feeding mechanism, and draw it rapidly rearward, in a manner to separate independent portions thereof entirely from the original bulk controlled by said primary feeding means the jaws being yieldingly pressed together by means of the guide rails 26. When the jaws have reached a predetermined limit of rearward movement the rollers on the bars are released from contact with the guide rails, and the springs 23 operate to separate the jaws and release the straw from their grasp, and when so released the straw falls upon a lower transverse carrier comprising endless belts 34, supported at their outer ends upon pulleys 35 carried by a short shaft 36 mounted in longitudinal bearings 37 secured to the main frame, and at their inner ends upon idle pulleys 38 suitably mounted on the frame of the breaker mechanism, such as is shown in patent issued to me July 11, 1905, No. 794,284, the feed wheel 40 representing the wheel 50 of the patent.

To insure a quick transfer of the straw from the grasping jaws of the secondary feeding mechanism to the transverse carrier, a swinging plate 41 is mounted at its forward edge upon a transverse rod 42, carried by the guide rails 26, and 43 represents springs operative to swing the plate downward about its pivotal connection. The forward edge of the plate is above and adjacent to the receiving end of the carrier, and its body extends rearward approximately the length of the guide rails, and in operation the grasping jaws as they move rearward swing the plate upward against the action of the springs, and when the jaws are released from the control of the guide rails the plate is simultaneously released of its control by the jaws, and it immediately swings downward, carrying the straw with it, which it deposits upon the transverse carrier.

Motion is transmitted to the various parts by means of a belt 44 from the breaker mechanism to a shaft 45, arranged longitudinally relative to the feeder frame and transmitting motion to the transverse carrier by means of the chain belt 46, and by means of gears 47 and 48 to a transverse shaft 49, that in turn transmits motion through the chain belt 49¹ to the shaft 17 that drives the lower carrier of the secondary feeding devices directly, and indirectly the upper carrier through gears 50 and 51 at the opposite side of the machine. A gear 52 is secured to the end of shaft 16 of the lower carrier and it meshes with a gear 53 mounted upon a stud adjustable in a slotted arm 54. Integral with the gear 53 is a pinion 55 that meshes with a gear 56 secured to a shaft 57, having suitable sprocket wheels secured thereto and adapted to drive the endless carrier 8, said carrier transmitting motion to a cross shaft 58 located in rear of the fluted rollers 6 and 7, and having secured thereto a gear 59 meshing with an intermediate gear 60 mounted upon a stud 61 carried by an adjustable slotted arm 62; the gear 60 meshing with a gear 63 secured to the journal of the roller 7, and a spur gear 64 at the opposite end of the roller 7 meshes with an intermediate gear 65 mounted on a stub shaft 66 on the main frame, said gear 65 meshes with a gear 67 on the shaft 5, thereby driving the endless conveyer 3.

The gears 60 and 53 are what are usually called change speed gears; that is, they may be removed and replaced by others in order to vary the speed of the different parts as desired to meet changed conditions, by manipulating the adjustable gear carrying brackets in a common manner. The straw is placed upon the primary feed conveyer by the attendant in bunches that are partially spread thereon, and it will be observed that the gill chain in rear of the fluted feed rollers is driven at a greater speed than the peripheral speed of the rollers, and in consequence thereof has a drawing action upon the straw operative to straighten it and present it endwise to the grasping jaws of the secondary feeding mechanism in a comparatively thick sheet, and the jaws intermittently and successively engage with portions of the sheet of straw and then move rearward at a much greater speed than the gill chain carrier, resulting in a swift drawing of successive thin independent and separate sheets from the original and transferring them to the transverse carrier.

What I claim as my invention, and desire to secure by Letters Patent, is:

1. In a machine of the class described, the combination of primary and secondary feeding means operative lengthwise of the straw, said primary means controlling the straw in bulk and said secondary means adapted to intermittently separate successive and independent parts from the bulk controlled by the primary means.

2. In a machine of the class described, the combination of primary and secondary feeding means operative lengthwise of the straw, said primary means controlling a sheet of straw and operative to advance it toward the secondary means, said secondary means adapted to intermittently draw separate successive and independent sheets from that controlled by said primary means.

3. In a machine of the class described, the combination of primary and secondary feeding means operative lengthwise of the straw, said primary means comprising a gill chain adapted to control the straw in bulk and advance it toward said secondary means, said secondary means adapted to intermittently grasp the ends of successive portions of the straw so controlled and separate it in independent portions.

4. In a machine of the class described, the combination of primary and secondary feeding means operative lengthwise of the straw, said primary means adapted to control a sheet of straw and advance it toward said secondary means, said secondary means adapted to intermittently grasp the ends of successive portions of the straw throughout the width of the sheet and separate it in independent sheets.

5. In a machine of the class described, the combination of primary and secondary feeding means operative lengthwise of the straw and adapted to feed it in one direction, said primary means adapted to control the straw in bulk and advance it toward said secondary means, a transverse carrier, said secondary means adapted to separate successive portions from the bulk controlled by the primary means and transfer them to said transverse carrier.

6. In a machine of the class described, the combination of primary and secondary feeding means operative lengthwise of the straw and adapted to feed it in one direction, said primary means adapted to control the straw in bulk and advance it toward said secondary means, a transverse carrier arranged below said secondary means, said secondary means adapted to separate successive portions from the bulk controlled by the primary means and transfer them to said transverse carrier.

7. In a machine of the class described, the combination of primary and secondary feeding means operative lengthwise of the straw and adapted to feed it in one direction, said primary means adapted to control a sheet of straw and advance it toward said secondary means, a transverse carrier arranged below said secondary means, said secondary means adapted to grasp and separate successive sheets from that controlled by said primary means and transfer them to said transverse carrier.

8. In a machine of the class described, the combination of primary and secondary feeding means operative lengthwise of the straw to advance it in one direction, said primary means controlling a sheet of straw, said secondary means comprising grasping mechanism arranged transversely relative to the length of the straw, and automatic means operative to cause said mechanism to grasp the ends of a portion of the sheet of straw and draw a separate sheet therefrom, and means for releasing said grasping mechanism when a predetermined limit of travel has been reached.

9. In a machine of the class described, the combination of primary and secondary feeding means operative lengthwise of the straw to advance it in one direction, said primary means controlling a sheet of straw, said secondary means comprising a series of grasping devices arranged transversely relative to the direction of travel of the straw, and automatic means operative to cause each of said series of grasping devices to grasp the ends of a portion of the sheet of straw and draw successive sheets therefrom, and means for releasing each of said series of grasping devices when a predetermined limit of travel has been reached.

10. A feed mechanism for flax breakers comprising, in combination, horizontally arranged endless carriers comprising upper and lower opposing members, said members having endless chains at opposite sides thereof, transverse rods having their opposite ends connected with said chains, bars arranged parallel with said rods, pivotally connected therewith and operative as coacting grasping jaws during a part of the travel of said carriers, springs operative to separate said jaws, and means operative during a part of the travel of the carriers to move said jaws in an opposite direction, and means for presenting the straw endwise to said carriers.

11. A feed mechanism for flax breakers comprising, in combination, horizontally arranged endless carriers comprising upper and lower opposing members, said members having endless chains at opposite sides thereof, transverse rods having their opposite ends connected with said chains, bars arranged parallel with said rods, pivotally connected therewith and operative as coacting grasping jaws during a part of the travel of said carriers, springs coiled around said rods and operative to separate said jaws, upper and lower guiding tracks operative to move said jaws in an opposite direction, and means for presenting the straw endwise to said carriers.

12. A feed mechanism for flax breakers comprising, in combination, horizontally arranged endless carriers comprising upper and lower opposing members, said members having endless chains at opposite sides thereof, transverse rods having their opposite ends connected with said chains, bars arranged parallel with said rods, pivotally connected therewith and operative as coacting grasping jaws during a part of the travel of said carriers, springs coiled around said rods and operative in a manner to separate said jaws, upper and lower guiding tracks operative to yieldingly hold said jaws in a closed position, and means for presenting the straw endwise to said jaws.

13 A feed mechanism for flax breakers comprising, in combination, horizontally arranged endless carriers comprising upper and lower opposing members, said members having endless chains at opposite sides thereof, transverse rods having their opposite ends connected with said chains, bars arranged parallel with said rods, pivotally connected therewith and operative as coacting grasping jaws during a part of the travel of said carriers, springs coiled around said rods and operative in a manner to separate said jaws, upper and lower carrier tracks operative to hold said jaws in closed position, said upper track adapted to move in a vertical plane against spring pressure adapted to hold it in contact with one of said coacting jaws, and means for presenting the straw endwise to said jaws.

14. A feed mechanism for flax breakers comprising, in combination, horizontally arranged endless carriers comprising upper and lower opposing members, said members having endless chains at opposite sides thereof, transverse bars connecting the chains of each member and adapted to coact as grasping jaws during a part of the travel of said carriers, means for presenting the straw endwise to said jaws, and a transverse carrier located below said first mentioned carriers and adapted to receive the straw therefrom.

15. A feed mechanism for flax breakers comprising, in combination, horizontally arranged endless carriers comprising upper and lower opposing members, said members having endless chains at opposite sides thereof, transverse bars connecting the chains of each member and adapted to coact as grasping jaws intermittently during the travel of said carriers, means for presenting the straw endwise to said jaws, a transverse carrier located below said first mentioned carriers, and means for transferring the straw when released from said coacting jaws onto said transverse carrier.

16. A feed mechanism for flax breakers comprising, in combination, horizontally arranged endless carriers comprising upper and lower opposing members, said members having endless chains at opposite sides thereof, transverse bars connecting the chains of each member and adapted to intermittently coact as grasping jaws during the travel of said carriers, means for presenting the straw endwise to said jaws, a transverse carrier located below said first mentioned carriers, and means comprising a swinging plate adapted to contact with the straw when released from said grasping jaws and press it downward toward said transverse carrier.

17. A feed mechanism for flax breakers comprising, in combination, horizontally arranged endless carriers comprising upper and lower opposing members, said members having endless chains at opposite sides thereof, transverse bars connecting the chains of each member and adapted to intermittently coact as grasping jaws during the travel of said carriers, means for presenting the straw endwise to said jaws, a transverse carrier located below said first mentioned carriers, a plate pivotally suspended on transverse pivots above said first mentioned carriers and adapted to contact with the straw when released from said grasping jaws and press it downward toward said transverse carrier.

18. A feed mechanism for flax breakers comprising, in combination, horizontally arranged endless carriers comprising upper and lower opposing members, said members having endless chains at opposite sides thereof, transverse bars connecting the chains of each member and adapted to intermittently coact as grasping jaws during the travel of said carriers, means for presenting the straw endwise to said jaws, a plate having one edge pivotally supported upon transverse pivots above and adjacent to the receiving end of said carriers and overhanging the carriers toward their delivery end, said grasping jaws adapted to contact with said plate and swing it upward about its pivots when acting as grasping and carrying elements, said plate being free to swing downward when released from said jaws, and a transverse carrier located below said first mentioned carriers and adapted to receive the straw when released from said jaws and pressed downward by said plate.

19. A feed mechanism for flax breakers comprising, in combination, a main frame, fixed guide rails mounted upon opposite sides of said frame, endless carrier chains having their upper runs supported by said guide rails, yielding guide rails mounted on said frame above said first mentioned rails and substantially parallel therewith, a series of transverse bars having their opposite ends connected with said chains, and rollers journaled thereon and engaging with said rails, said bars having opposing toothed surfaces and adapted to coact in pairs as grasping jaws during their contact with said rails, and means for presenting the straw endwise to said jaws.

GEORGE H. ELLIS.

Witnesses:
A. E. PONATH,
L. R. EVANS.